United States Patent [19]

Kellogg

[11] 3,725,792

[45] Apr. 3, 1973

[54] JITTER-FREE TRIGGER CONTROL CIRCUIT

[75] Inventor: James R. Kellogg, Hillsboro, Oreg.

[73] Assignee: Tektronix, Inc., Beaverton, Oreg.

[22] Filed: Jan. 7, 1972

[21] Appl. No.: 216,070

[52] U.S. Cl. ....................328/60, 307/215, 307/228, 307/260, 307/289, 328/185

[51] Int. Cl. ..............................................H03k 4/08

[58] Field of Search......307/215, 228, 232, 260, 286, 307/289; 328/181–185, 60, 59, 61, 62

[56] References Cited

UNITED STATES PATENTS

| | | | |
|---|---|---|---|
| 3,339,088 | 8/1967 | Dillard | 307/228 X |
| 3,350,576 | 10/1967 | Zimmerman | 307/286 X |
| 3,358,159 | 12/1967 | Smith | 307/228 |
| 3,408,580 | 10/1968 | Moriyasu | 307/228 X |
| 3,530,315 | 9/1970 | Kaufman | 307/286 |
| 3,558,930 | 1/1971 | Knapton et al. | 307/286 |
| 3,676,707 | 7/1972 | Conrad et al. | 307/228 X |

*Primary Examiner*—Stanley D. Miller, Jr.
*Attorney*—Stephen W. Blore et al.

[57] ABSTRACT

An enabling signal for a trigger control logic gate is changed from a non enabling level to an enabling level by a flip-flop actuated by an output from a second gate when a holdoff signal from a triggered circuit applied to an input of the second gate changes from a holdoff level to a non holdoff level during the time interval when an input trigger signal from a trigger circuit, also applied to an input of the second gate, is at a non triggering level. The input trigger signal is also applied to another input of the trigger control gate and timed so that the non triggering level of such signal prevents a triggering operation by such gate during the time interval when a change of the enabling signal to its enabling level can be delivered to such gate. The timing of the application of input triggering signal to the trigger control gate is such that a change of such signal to a triggering level occurs only after the time interval referred to. The triggering operation of the trigger control gate causes the flip-flop to be reset to change the enabling signal back to its original level and also resets another flip-flop to produce the output signal, the second flip-flop having been previously set by the holdoff signal.

9 Claims, 5 Drawing Figures

JITTER-FREE TRIGGER CONTROL CIRCUIT

BACKGROUND OF THE INVENTION

In a cathode ray oscilloscope for portraying a repetitive waveform, the term "jitter" refers to the horizontal displacement of the portrayed waveform between successive displays of such waveform, which occurs if triggering of the sweep or horizontal time base is inaccurately accomplished. In many oscilloscopes a triggering signal is derived from each repetition of the input waveform for application to a sweep generator. A trigger signal causes the sweep generator to produce a horizontal time base, e.g. a sweep waveform, which in turn causes deflection of an electron beam from the left side to the right side of a cathode ray tube screen. If the trigger signals supplied to the sweep generator are not in a correct time relation with the repetitive input waveform, the sweep generator does not start each sweep waveform in accurately timed relation with successive trigger signals and jitter of the portrayed waveform will result.

After each sweep waveform is generated by the sweep generator, the sweep generator reverts to a quiescent state and must completely recover from the sweep generating operation before it is again triggered to generate another sweep waveform if jitter is to be avoided. For this purpose, the horizontal sweep system is conventionally provided with a holdoff circuit which disables the triggering of the sweep generator until the latter is capable of providing an accurate sweep waveform. A holdoff signal is produced by the holdoff circuit and is used to inhibit the triggering of the sweep generator. At the end of the holdoff period, the change of the holdoff signal from a holdoff level to a non holdoff level is either used directly to enable a triggering operation by a triggering element of the circuit, or is used to produce an enabling signal, in which case a change of the enabling signal from a non enabling level to an enabling level is used to enable such triggering operation. In either case, if the change to a triggering level of the trigger signal has already arrived and is present at the trigger control element or is arriving at such element when the enabling change of level of the holdoff or enabling signal arrives at such element, triggering jitter can occur. Under these conditions it is an enabling change of level of the holdoff or enabling signal which sets the time when triggering occurs rather than the input trigger signal.

Previous United States patents concerned with the problem of reducing triggering jitter are U.S. Pat. Nos. 3,530,315; 3,350,576 and 3,558,930. The circuits shown in the latter two patents markedly reduce the probability of trigger jitter. However, certain combinations of sweep speed, holdoff time and input signal frequency which result in trigger jitter can still occur. Manual adjustment, for example, adjustment of the holdoff time, can be employed each time such a combination occurs to eliminate the jitter but a change in input signal frequency can again result in trigger jitter requiring further manual adjustment. While the circuits of the first of such patents can completely prevent jitter when operating properly, such operation depends upon the accurate summation of currents in negative resistance circuits involving expensive tunnel diodes, which tend to unpredictably change their characteristics. The circuit of the present application completely prevents trigger jitter by employing relatively inexpensive digital logic elements producing stable operation depending entirely upon the time relations of digital signals.

SUMMARY OF THE INVENTION

In accordance with the present invention, the input trigger signal is employed to prevent operation of a trigger element to produce an output trigger signal under conditions which can cause trigger jitter. The non triggering level of the input trigger signal is employed to restrict the time during which a trigger enabling signal can be changed to an enabling level as a result of a change in a holdoff signal from a holdoff level to a non holdoff level. This restriction is to a time interval commensurate with the time the input trigger signal is at a non triggering level. The changes of the enabling signal which occur during this interval are delivered to the triggering element. The input trigger signal is also delivered to the triggering element and timed so that the non triggering level of this signal prevents triggering of the triggering element during the time interval the changes of the enabling signal to an enabling level are being delivered to the triggering element. The input trigger signal delivered to the triggering element is also timed so that it can only change to a triggering level to cause triggering of trigger element after such time interval. The result is that triggering cannot be caused at the time the enabling signal is changing to an enabling level but can only be caused by a subsequent change of the trigger input signal to its triggering level. This eliminates trigger jitter.

In the specific embodiment of the invention shown, an output signal from the trigger control circuit is delivered to the triggered circuit to start the triggered operation only when the following definite series of events has occurred in the trigger control circuit.

1. A first control signal is produced as a result of the change of the holdoff signal from a non holdoff level to a holdoff level and this control signal is maintained until later terminated at the time the output signal is produced.

2. A second control signal is produced any time there is concurrent existence of the first control signal, the non holdoff level of the holdoff signal and a non triggering level of the input trigger signal.

3. A third control signal produced as a result of the production of the second control signal is delivered as an enabling signal to a trigger control element. This enabling signal persists until terminated as a result of triggering of the trigger element.

4. The input trigger signal is also delivered to the trigger element and is timed so that its non triggering level is applied as a triggering inhibiting signal to such element before an enabling signal can arrive at the triggering element. The timing is such that this inhibiting signal is effective until after the time any enabling signal can arrive at the triggering element.

5. The input trigger signal thereafter changes to a triggering level and causes the control circuit to produce an output trigger signal and to also terminate the first control signal and the enabling signal, the second control signal having been terminated as a result of the change of the input trigger signal in the first signal path to a triggering level.

The occurrence of the above series of events in the trigger control circuit not only makes it possible for the triggered circuit to be triggered into operation before such triggered circuit has reverted from and has fully recovered from a prior triggered operation, but also makes it impossible for a triggering signal to be applied to a trigger control element when an enabling signal, such as a holdoff signal or a triggering enabling signal also applied to the triggering control element, is changing from a non enabling level to an enabling level.

In a preferred embodiment of the invention, circuits responsive to the input trigger signal and holdoff signal comprise nor logic gates and signal inverters connected to a pair of storage flip-flops. This type of circuit takes advantage of the inherent reliability of digital circuits and makes it feasible to fabricate an entire trigger control system as a single integrated circuit.

It is accordingly on object of the present invention to provide substantially jitter-free triggering of a triggered circuit.

It is another object of the present invention to eliminate the necessity for manual adjustments, such as adjustments of holdoff time, in order to clear up trigger jitter.

It is a further object of the present invention to provide an improved method and apparatus for triggering an oscilloscope or the like which is substantially free of jitter produced at the termination of conventional holdoff signals.

It is a further object of the present invention to provide an improved triggering system for an oscilloscope or the like which rapidly responds automatically to a triggering signal to initiate a deflection or sampling operation in correctly timed relation with the triggering signal.

DESCRIPTION OF PREFERRED EMBODIMENT

Figure 1:
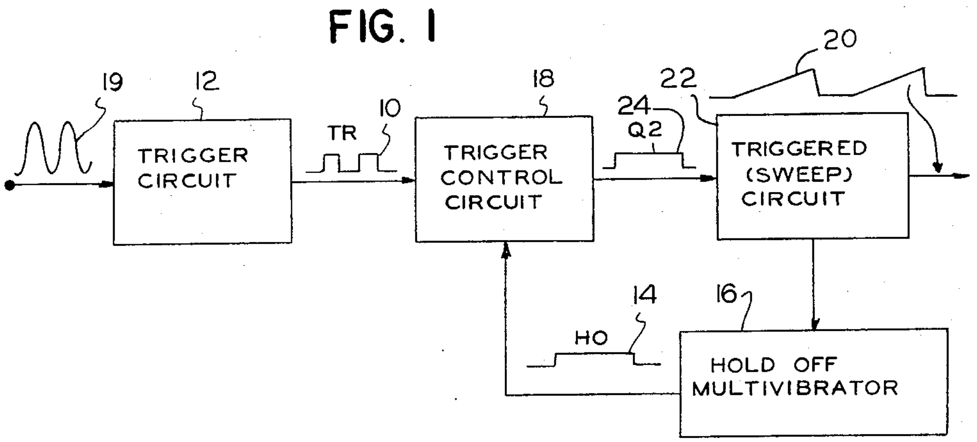
FIG. 1 is a block diagram of a trigger jitter control circuit suitable for use in an oscilloscope.

FIG. 1 illustrates a typical application of the present invention. Trigger signals 10 also designated TR from a trigger circuit 12 and holdoff signals 14 also designated HO from a holdoff multivibrator 16 are applied as inputs to a trigger control circuit 18. The trigger signals 10 have a definite time relationship with the input signal 19 to the trigger circuit 12. The holdoff multivibrator 16 is conventionally a monostable or one shot multivibrator actuated at the end of the voltage ramp 20 produced by a sweep circuit 22 to change the holdoff signal 14 to a holdoff level which then decreases to a non holdoff level after the sweep circuit has returned to its initial quiescent level and has fully recovered from the ramp producing operation. The trigger control circuit 18, by means of logic gating and storage and delay circuits shown in detail in FIG. 2 generates as its output signal a sweep start signal 24, also designated Q2, which is virtually free from jitter.

Figure 2:
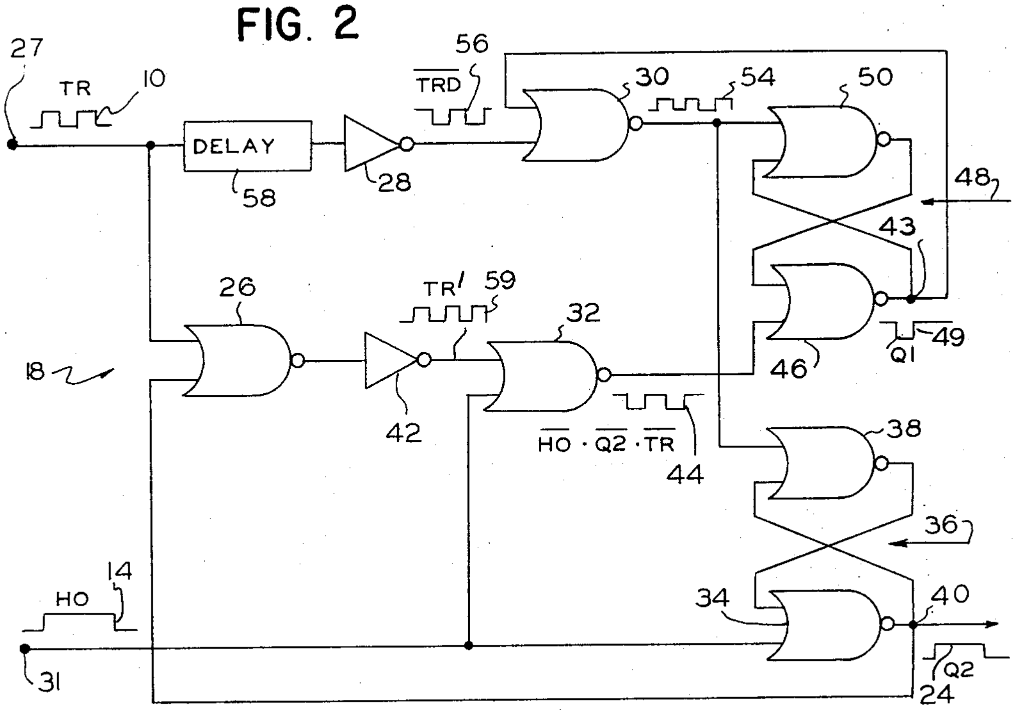
FIG. 2 is a schematic circuit diagram of a trigger jitter control according to the present invention.

A specific embodiment of the present invention is shown in FIG. 2.

This circuit is shown as including a plurality of separate logic components merely for the purpose of facilitating the explanation of the circuit, but it will be understood that the actual circuit can be one or more suitably connected integrated circuits having many more circuit elements for producing the same functions in a more accurate and more rapid manner.

The input trigger signal 10 is applied to a nor gate 26 through an input terminal 27 and also through an inverter 28 to a nor gate 30. The holdoff signal 14 is applied through another input terminal 31 to another nor gate 32 and also to a nor gate 34 forming part of a flip-flop or set-reset bistable multivibrator 36 also having another nor gate 38 cross connected to the nor gate 34. The output 24, also designated Q2, produced at the terminal 40 of the flip-flop 36 constitutes the output signal of the trigger control circuit 18. The positive excursions of signal 24 can function as sweep start signals for the sweep sircuit 22 of FIG. 1. This signal 24 from the flip-flop 36 is also delivered to the input of nor gate 26 and constitutes a first control signal for the triggering operation performed by the trigger control circuit 18.

The output of the nor gate 26 is delivered through an inverter 42 to the nor gate 32. It will be apparent that the combination of the nor gate 26, inverter 42 and nor gate 32 function as a three input negative logic nand gate, such that the output 44 of the nor gate 32 is at a high level when and only when all of the inputs to gates 26 and 32 are at a low level. This is indicated by the logic product $\overline{HO} \cdot \overline{Q2} \cdot \overline{TR}$ also employed to designate the output signal 44 of the gate 32.

The output 24 of the flip-flop 36 is high immediately after a triggering operation as will be later described. The holdoff signal 14 is changed from a low level to a high level at the end of a sweep ramp 20 resulting from a previous triggered operation of the sweep generator 22 and this high level of the holdoff signal is applied to the nor gate 34 of the flip-flop 36 to cause this flip-flop to change from a first steady state to a second steady state. The result is that the output 24 of this circuit goes to its low level when the holdoff signal 14 goes to a high level and this low level signal 24 persists until the flip-flop 36 is changed back to its former state as the result of a triggering operation. This low level of the signal 24 is applied to the gate 26. When the holdoff signal 14 again goes low at the end of the holdoff period, one of the inputs to the nor gate 32 also goes low.

The holdoff signal 14 cannot again go high until the sweep circuit 22 has been triggered into operation and another ramp output 20 produced so that the holdoff signal input to the gate 32 is maintained low until after there is a triggering operation and the sweep circuit again produces a sweep. The output 24 of the flip-flop 36 also remains low until this flip-flop is changed back to its original state as a result of a triggering operation so that one input to the gate 26 also remains low until there is a triggering operation.

Under conditions just stated, the output 44 of the gate 32 is entirely under control of the input trigger signal 10. If the input trigger signal 10 is low at the time the low input to each of the gates 26 and 32 is established as just described, or at any time the trigger signal thereafter goes low, a high output from the gate 32 is delivered as a second control signal to a nor gate 46 forming part of another bistable multivibrator or flip-flop 48 having another nor gate 50 cross connected with the gate 46. This second control signal 44 causes the flip-flop 48 to change from a first stable state in which its output 49 at the terminal 43, also designated Q1, is high, to its second stable state in which the output 49 is low. This low level of the output 49 is a third control signal or enabling signal which persists until the flip-flop 48 is returned to its original stable state as a result of a triggering operation.

The low level enabling signal 49 is delivered to the nor gate 30 and enables this gate to produce a high output 54 when and only when the trigger signal 10 again goes high to produce a low level at the output 56, also designated $\overline{TRD}$, of the inverter 28. This high output is delivered to the nor gates 38 and 50 of the flip-flops 36 and 48 and causes both of these flip-flops to change back to their first stable state to thereby cause their outputs 24 and 44 to again become high. This sends an output sweep start signal from the flip-flop 36 to the sweep circuit 22. The trigger control circuit is then back in its original condition just after a triggering operation ready to repeat the operation just described. accomplished.

It will be apparent from the above that the nor gate 30 functions as the triggering element of the trigger control circuit 18. If the low level of the output 56 of the inverter 28 arrives at the gate 30 after this gate has been enabled by the low level of the enabling signal 49 from the flip-flop 48 and there is no possibility that the enabling of the gate 30 can occur after the low level of the output 56 of the inverter 28 has been applied to and is in existence at the gate 30, then triggering is completely under control of the triggering signal 10 and jitter free triggering of the triggered sweep circuit 22 is accomplished. The present circuit is such that both of these requirements are satisfied. The explanation of how this is accomplished is however complicated by the fact that the propagation delays of the signal in the various components of the trigger control must be considered.

By balancing the propagation delays through the signal path from the terminal 27 to the gate 30 including the inverter 28 with the propagation delays from the terminal 27 through the gate 26, inverter 42, gate 32 and flip-flop 48 the requirements of the previous paragraph can be met. It has been found that the propagation delays in the signal path including the inverter 28 should be slightly greater than the propagation delay in the path including the gate 26. Under these conditions the non trigger level of the input trigger signal 27 and the corresponding portion of the inverted trigger signal 56, also referred to herein as its non trigger level, can be employed so that one of such signals always inhibits triggering by the circuit when inaccurate triggering would otherwise take place.

In the particular circuit shown it is apparent that there are more delaying components in the signal path including the gate 26 between the terminal 27 and the gate 30 than in the signal path including the inverter 28. If all of these components are assumed to have equal delays for purposes of explanation, then additional delay indicated by the block 58 must be inserted in the path including the inverter 28 to produce non jitter triggering. This added delay can be produced, for example, by employing as the block 58, a suitable delay line or by adding a pair of inverters such as the inverter 28 in series. Other ways would be to employ a circuit similar to a Schmitt trigger which does not again invert the signal or even the signal propagation time of the inverter 28 can be increased. It is apparent that the block 58 is a timing means for timing the delivery of the input trigger signal 10 to the triggering gate 30 and that, if the delays in the signal path between the terminal 27 and the gate 30 are too great in the absence of the delay caused by the circuit 58, then a similar circuit can be inserted in the signal path including the gate 26 as the timing means.

Figure 3:
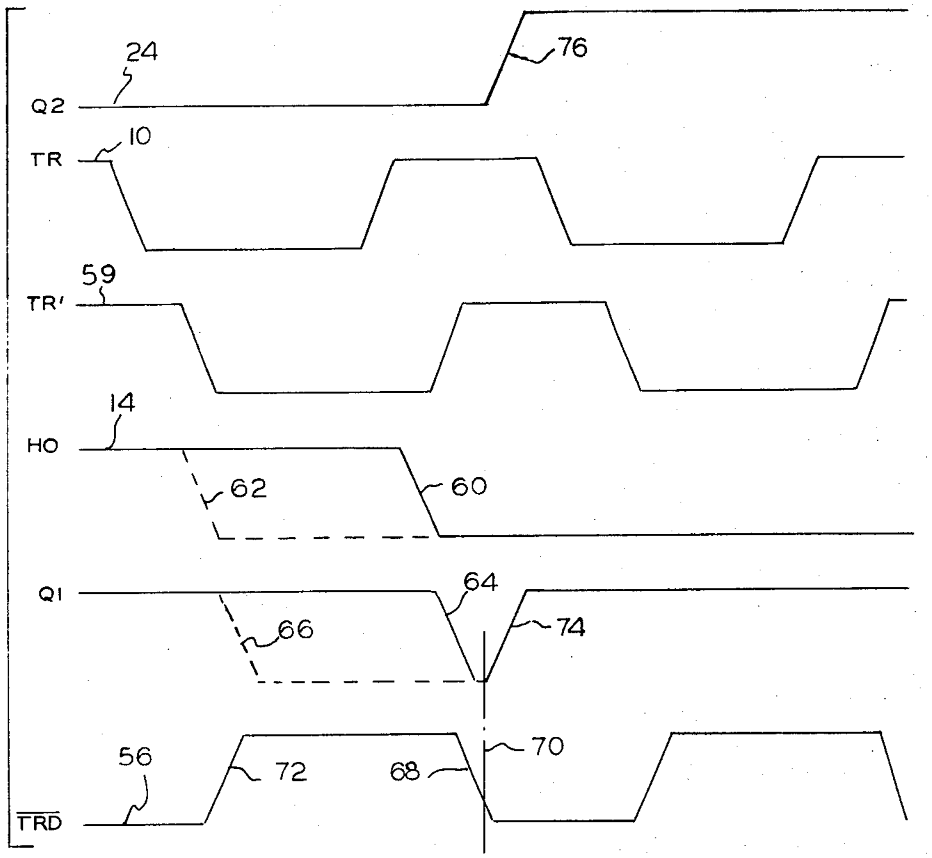
FIG. 3 is a waveform chart illustrating operation of the circuit of FIG. 2.

In FIG. 3 the incoming trigger signal 10 as shown on an enlarged scale with the rise and fall times of such signal exaggerated for purposes of explanation. In this figure the delay times in the circuit includes the propagation delays in each of the delaying components other than the block 58 are assumed to be equal. In a practical integrated circuit these delays can be of the order of a few nanoseconds down to 1 nanosecond or less and may not be equal.

For purposes of explanation, the control signal 24 is assumed to be low as a result of a high level of the holdoff signal 14 produced during or at the end of a triggered operation of the triggered circuit 22 of FIG. 1 so that the input trigger signal passes through the gate 26 and inverter 42 and arrives as the signal 59, also designated TR', at the gate 32 after a time delay. Under these conditions it is possible for a decrease in level of the holdoff signal 14 to arrive at an input to the gate 32 in any time relation whatever with respect to changes in the signal 59 also arriving at another input to this gate.

A critical point of operation is at the time when the change in the holdoff signal 10 from a high holdoff level to a low level arrives at the gate 32 at about the time that a change in the input trigger signal 10 from a low non triggering level to a high triggering level also arrives at such gate 32. A change in the holdoff signal 14 from a high holdoff level to a low non holdoff level is indicated by the downwardly incline line 60. An increase in the level of output from the gate 32 causing the enabling signal 49 from the flip-flop 48 to go to its enabling low level can only occur while the signal 59 is low. Thus the line 60 represents the end of the time interval when the holdoff signal at the input to the gate 32 can cause a low enabling level of the enabling signal 49. The dotted line 62 indicates the beginning of such time interval. A termination of the holdoff signal 14 indicated by the line 60 results in the production of a low level of the enabling signal 49 along the line 64 after a time delay, and similarly a termination of the holdoff signal along the dotted line 62 causes the enabling signal to go to a low enabling level along the dotted line 66. Any termination of the holdoff signal other than in the time interval between the lines 62 and 60 will not cause the enabling signal to go low since the signal 59 will be high during such other times. This means that the enabling signal 49 can only go low in the time interval between the lines 66 and 64.

The low level of the enabling signal 49 enables the gate 30 which functions as a trigger control element to produce a high level output whenever the inverted and delayed input trigger signal 56 applied to the gate 30 changes to its low triggering level. If the signal 56 is delayed so that it goes to its low level along a line 68 just after the latest time indicated by the line 64 at which the enabling signal 49 can reach its low level, i.e. along the line 64, then any enabling low level of the enabling signal which is produced in the time interval between the lines 66 and 64 will result in triggering at the time indicated by the line 70. Thus the high level of the inverted and delayed input trigger signal 56 prevents triggering during the time interval between such lines 66 and 64.

It is to be noted that the signal 56 goes to its high level along a line 72 just prior to the beginning of the time interval indicated by the dotted line 66. The high levels of the input trigger signal 59 applied to the gate 32 through one signal path thus prevents enabling of the gate 30 for a triggering operation except during restricted time intervals. The high levels of the inverted and delayed input triggering signal applied to the trigger control gate 30 prevents triggering by this gate during such restricted time intervals. Triggering can only occur immediately after such restricted time intervals since the signal 56 again goes low only after the termination of the time interval in which enabling of the gate 30 can occur.

The triggering by the gate 30 is possible after the termination of such period in which enabling can take place, since the low level of the triggering signal after once being produced is maintained until triggering has occurred. A high level of the output signal 54 from the gate 30 resets both flip-flops 36 and 48 and produces a high level of output of both the signals 24 and 49 as indicated by the lines 74 and 76, respectively.

It is apparent that the input triggering signal 10 is employed in conjunction with an inverted and phase shifted or delayed reversion 56 of this input signal 10 to completely control the time of triggering. Thus the high level of the input triggering signal in one signal path acts as an inhibiting signal to prevent triggering portion of a triggering cycle and a high level of the inverted and delayed version of this signal acts as a triggering inhibiting signal for another portion of the triggering cycle. The triggering operation can only occur when the inverted signal goes from a high to a low level after the holdoff signal from a previous triggered operation of the sweep circuit has terminated its holdoff function.

It is also apparent that the inverter 28 can be removed from the input trigger signal path between the terminal 27 and the gate 30 and installed in the signal path between the terminal 27 and the gate 26 and the delay indicated by the block 58 adjusted to compensate for the lesser delay in one circuit and the greater delay in the other. The result is merely to cause triggering in timed relationship with the negative excursion of the input triggering signal 10 instead of with the positive going excursion as in the circuit described.

Also the three inputs of the holdoff signal 14, the signal 24 from the flip-flops 36 and the input trigger signal 10 to the gates 26 and 32 can be interchanged in any way, if the delays in the two circuits branching from the terminal 27 are adjusted to produce the required time relationship between the input trigger signal 10 and the inverted input trigger signal 56 at the gate 30.

It is to be noted that the employment of the output signal 24 from the flip-flop 36 as an input to the gates 26 and 32 is for the purpose of preventing output trigger signals from being sent to the triggered circuit after such triggered circuit has been triggered into operation and before the holdoff signal is thereafter changed from its non holdoff level to a holdoff level. If, in any particular circuit, the holdoff signal is changed back to its holdoff level as soon as such triggered operation is initiated, then it is unnecessary to employ the signal 24 as an input to the gates 26 and 36. The gate 26 and the inverter 42 can be eliminated, the input of the trigger control signal from the terminal 27 can then be connected directly to the gate 32, and the input connection for the signal 24 from the flip-flop 36 to the gate 26 also eliminated.

As indicated above the flip-flops can be modern integrated circuit high speed flip-flops, such as J–K, D, S–R or other available integrated circuit flip-flops. Also the various other gates and inverters shown can be assembled by employing one or more integrated circuits having a plurality of nor gates, since the inverters may be nor gates with their two inputs connected together. For circuits requiring triggering from very high frequency waveforms, the entire circuit including the delay element 58 can be fabricated as one large scale integrated circuit. Also various other combinations of logic elements can be employed to produce the same functions described above.

The operation of the circuit of the present invention has been described in connection with a square wave type of input trigger signal, such as a signal produced by a Schmitt trigger type of trigger circuit operation. The present circuit will however operate successfully when the triggering level of such a signal is very short and will therefor operate with an input signal resulting from differentiating the square wave signal from the trigger circuit to produce very narrow trigger pulses, but such differentiating is not necessary.

It is to be noted that the time relationship between the input trigger signal 10 and the inverted and delayed input trigger signal 56 must be quite accurately adjusted. Thus if the signal 56 in FIG. 3 is shifted slightly forward in time, i.e. to the left in FIG. 3, the production of a low value of the enabling signal 49 along the line 64 can occur after the inverted input trigger signal 56 goes to its low value along the line 68. Triggering will then be caused by the termination of the holdoff signal rather than by the change of the signal 56 to its triggering level along the line 68.

Conversely, if the signal 56 of FIG. 3 is shifted slightly later in time, i.e. to the right in FIG. 3, a change to the low or enabling level of the enabling signal 49 along the line 66 will occur while the inverted input trigger signal 56 is still low, and again the actual triggering will be caused by the termination of the holdoff signal 41 rather than a change of the signal 56 to its triggering level. Both of these situations will cause trigger jitter.

Figure 4:
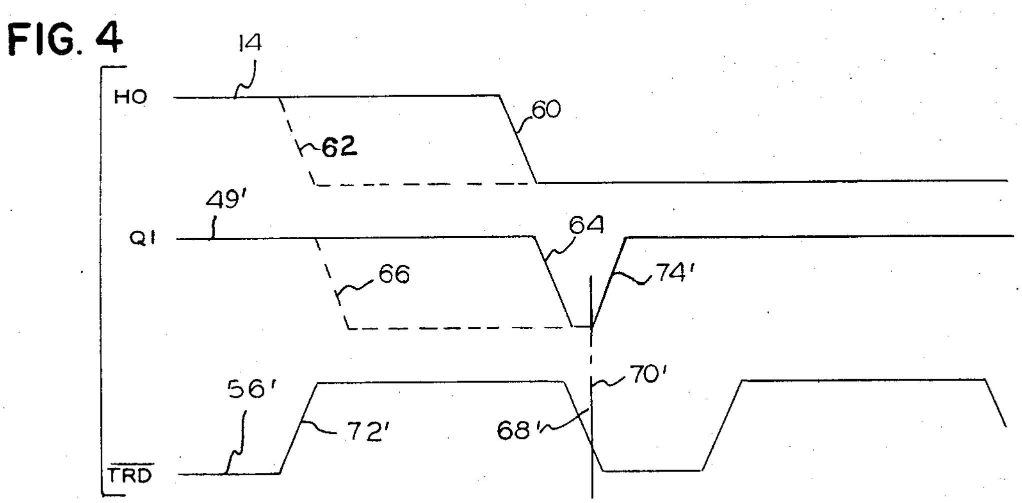
FIG. 4 is a similar chart illustrating a modified operation of the circuit of FIG. 2.

While no difficulty has been encountered in making and maintaining the required adjustment of the timing of the inverted and delayed input trigger signal so as to avoid trigger jitter in any of the several circuit thus far made and tested, any possibility of such difficulty occurring can be obviated by slightly shortening the time during which the inverted and delayed trigger signal 56 is at its low level without changing the time during which the trigger input signal 10 and the signal 59 are at their low level. This has the effect of shortening of the time the signal 56 is at its low level and increasing the time interval between the lines 72 and 68 of such signal, i.e. the time interval during which the signal 56 is at its high level. Such a modified inverted input trigger signal is shown at 56' in FIG. 4. Adjusting of the delay in the two circuits so that the center of the high level of the signal 56'', i.e. the level between the lines 72' and 68', maintains the same time relationship with the holdoff signal 14 as obtains in FIG. 3 and any chance of trigger jitter is eliminated. The only other changes in the signals are that a slightly later triggering operation indicated by the line 74' will be produced and a very slightly modified enabling signal 49' will result, since the termination of this signal indicated by the line 74' will be slightly delayed.

A similar change in the input trigger signal 10 sent to the gate 26 without any change in the signal 56 will accomplish a similar result.

Figure 5:
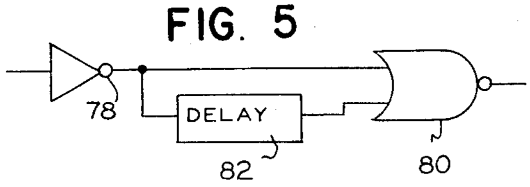
FIG. 5 is a modifying circuit which can be added to FIG. 2 to cause such modified operation.

A simple circuit which will increase the time intervals of the high levels of signals such as the signals 10 and 56 is shown in FIG. 5. This circuit includes an inverter 78, a nor gate 80 and a delay circuit 82. The output of the inverter 78 is delivered directly to an input of the gate 80 and the same output delivered to the other input of the nor gate through the delay circuit 82. A high output from this circuit occurs during the time the low levels of the inputs to the gate 80 overlap. The delay circuit 82 may be of any type discussed with respect to the delay circuit 58 of FIG. 2.

The circuit of FIG. 5 can be inserted in series in the branch signal path between the terminal 27 and the gate 26 of FIG. 2 to increase the time intervals of the high levels of the input trigger signal 10 delivered to the gate 26 or in series anywhere in the branch signal path between the terminal 27 and the gate 30 to increase the time intervals of the high levels of the inverted input trigger signal 56. In either case a compensating change is made in the delay of the circuit 58. If the circuit of FIG. 5 is inserted in the connection between the terminal 27 and the gate 26, it is advantageous to interchange such connection to the gate 26 and the connection of the holdoff signal 14 to the gate 32.

I claim:

1. A trigger control circuit responsive to an input trigger signal from a trigger circuit which changes from a non triggering level to a triggering level and also responsive to a holdoff signal from a triggered circuit for producing a jitter free output signal for triggering said triggered circuit, said control circuit comprising:

triggering means for causing production of said output trigger signal;

enabling means for producing an enabling signal and responsive to a change in said holdoff signal from a holdoff level to a non holdoff level for causing said enabling signal to change from a non enabling level to an enabling level and also responsive to said triggering level of said input trigger signal to prevent any said change of said enabling signal when said trigger input signal is at said triggering level;

said enabling means including means for delivering any said change of said enabling signal to said triggering means and then maintaining said enabling level at said triggering level;

input trigger signal delivery means for delivering said input trigger signal to said triggering means and timing such delivery to cause said non triggering level to prevent production of said output signal until after any said change of said enabling signal has been delivered to said triggering means;

said timing of said delivery of said input trigger signal to said triggering means also causing a change of level of said input trigger means to said triggering level only after any said change of said enabling signal has been delivered to said trigger means to thereby cause production of said output trigger signal and cause said enabling signal to change back to said non enabling level.

2. The trigger control circuit of claim 1 in which:

said enabling means includes logic gating means having an input connected to receive said input trigger signal, another input connected to receive said holdoff signal and an output which produces said enabling level of said enabling signal only when said trigger input signal is at said non triggering level and said holdoff signal is at said non holdoff level.

3. The trigger control circuit of claim 2 which also contains:

means for producing a control signal which changes from a first level to a second level when said holdoff signal changes to said holdoff level and said enabling means has another input connected to receive said control signal and produces said enabling level as an output only when said control level is at said second level.

4. The trigger control circuit of claim 2 in which:

said enabling means also contains a bistable circuit which changes from a one stable state to another stable state in response to said output from said gating means and delivers said change of said enabling signal to an enabling level to said triggering means.

5. The trigger control circuit of claim 4 in which:

said bistable circuit is responsive to the output of said triggering means and is changed back to its one stable state when said triggering means causes production of said output trigger signal.

6. The trigger circuit of claim 5 which also includes:

a second bistable circuit which is responsive to said holdoff signal and is changed from one stable state to another stable state when said holdoff signal changes to said holdoff level;

said second bistable circuit also being responsive to the output of said triggering means and is changed back to said one state to produce said output signal when said triggering means is triggered by said change of said trigger input signal delivered to said triggering means changes to triggering level.

7. The trigger control circuit of claim 1 in which:

said signal delivery means for delivering said input trigger signal to said triggering means inverts said trigger input signal and delivers the inverted signal to said triggering means at a time causing said inverted signal to change from a non triggering level to a triggering level only after any said change in level of said enabling signal has been delivered to said triggering means and so that said non triggering level prevents triggering by said triggering means during the time any change of said enabling signal to an enabling level can be delivered to said triggering means.

8. The method of producing a jitter free output trigger signal from an input trigger signal from a trigger circuit which changes from a non triggering level to a triggering level for triggering a triggered circuit under control of a holdoff signal from said triggered circuit which comprises:

producing a change in an enabling signal from a non enabling level to an enabling level in response to a change of said holdoff signal from a holdoff level to a non holdoff level;

preventing said change of said enabling signal when said input trigger signal is at said non triggering level;

employing said change in level of said enabling signal for enabling triggering of said triggered circuit;

employing said input trigger signal to cause said triggering of said triggered circuit;

and adjusting the timing of said input trigger signal employed for such triggering so that such timed input trigger signal changes from a non triggering level to a triggering level to cause said triggering only after any said change of said enabling signal to an enabling level has occurred.

9. The method of claim 8 which also includes:

preventing any said change of said enabling signal to said enabling level until after said holdoff signal has changed from a non enabling level to an enabling level as a result of a triggered operation of said triggered circuit.

* * * * *